(12) United States Patent
Takikura

(10) Patent No.: US 6,802,468 B2
(45) Date of Patent: Oct. 12, 2004

(54) WATER-SEALING COMPONENT ASSEMBLY

(75) Inventor: Koji Takikura, Izuma (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/080,412

(22) Filed: Feb. 25, 2002

(65) Prior Publication Data
US 2002/0125358 A1 Sep. 12, 2002

(30) Foreign Application Priority Data
Mar. 7, 2001 (JP) .......................... 2001-063349

(51) Int. Cl.⁷ .......................... A01K 89/01; A01K 89/15
(52) U.S. Cl. .......................... 242/319; 384/488; 384/480; 277/404; 277/406; 277/407; 277/652; 277/653
(58) Field of Search .......................... 242/319; 384/488, 384/480; 277/404, 406, 407, 652, 653

(56) References Cited

U.S. PATENT DOCUMENTS

| | | | | |
|---|---|---|---|---|
| 4,778,124 A | * | 10/1988 | Shinohara | 242/230 |
| 4,863,762 A | | 9/1989 | Aramaki et al. | |
| 5,615,841 A | * | 4/1997 | Saito | 242/231 |
| 5,882,121 A | * | 3/1999 | Saigusa | 384/488 |
| 6,149,089 A | * | 11/2000 | Matsuda | 242/319 |
| 6,164,577 A | * | 12/2000 | Koike | 242/322 |
| 6,176,446 B1 | * | 1/2001 | Sato | 242/319 |
| 6,533,202 B1 | * | 3/2003 | Koike | 242/310 |
| 2001/0042805 A1 | * | 11/2001 | Nakagawa et al. | 242/310 |
| 2002/0015543 A1 | * | 2/2002 | Pairone et al. | 384/477 |
| 2002/0088889 A1 | * | 7/2002 | Morise et al. | 242/322 |

FOREIGN PATENT DOCUMENTS

| | | | |
|---|---|---|---|
| EP | 0665274 A | 8/1995 | |
| JP | 03066981 A | * 3/1991 | ............ F16J/15/16 |
| JP | 2000-41543 A | 2/2000 | |

* cited by examiner

*Primary Examiner*—Kathy Matecki
*Assistant Examiner*—Evan Langdon
(74) *Attorney, Agent, or Firm*—Shinjyu Global IP Counselors, LLP

(57) ABSTRACT

Nut that screws together with pinion gear, and bearing that is arranged on the inner circumferential side of the nut, are provided on the front of a spinning-reel rotor. Pressing member is mounted on the front faces of the nut and bearing, such that it abuts on outer race of bearing. Pressing member is installed so as to be rotatable with respect to spool shaft, which is a rod element. Pressing member is water-repellency treated over all its surfaces, including the face that forms a clearance with spool shaft. The present invention prevents invasion of water droplets into rotatory-component clearances in a water-sealing component assembly composed of a relatively rotatable plurality of components, while sustaining rotational efficiency of the rotatory components.

21 Claims, 9 Drawing Sheets

WATER-SEALING COMPONENT ASSEMBLY

BACKGROUND OF THE INVENTION

1. Field of the Invention

The present invention relates to water-sealing component assemblies, in particular to water-sealing component assemblies composed of a relatively rotatable plurality of components.

2. Background Information

Rotatory components such as rod members and gears to which bearings are fitted may be cited as examples in component assemblies that are made up of a relatively rotatable plurality of components. Such rotatory components are used as constituent parts in, for example, fishing reels and bicycles.

As fishing reels that reel fishing line while being mounted onto a fishing rod, there are chiefly spinning reels, dual-bearing reels and cantilevered-bearing reels. A fishing reel of these types includes a reel unit that mounts onto a fishing rod, and a spool that is fitted to the reel unit and is for winding on fishing line through rotation of the handle. In dual-bearing reels and cantilevered-bearing reels, the spool is rotatably supported in the reel unit via bearings. In spinning reels, the spool is mounted axially movably as well as rotatably with respect to the reel unit.

Because they are often used at watersides, fishing reels as such fitted with sealing members are known in order to prevent water droplets from invading into the rotatory-component clearances. The sealing member is, for example, an element made of plastic, and is arranged in between rotatory components or stationary components, and mounted for contacting on a rotatory component.

Fitting sealing members in the clearances between the rotatory components enables the foregoing conventional fishing-reel component assemblies to prevent water droplets from invading the rotatory-component clearances. Nevertheless, since the sealing members are disposed contacting a rotatory component, frictional force acting on the rotatory component due to the sealing-member contact is liable to impair the rotational efficiency of the rotatory component.

In view of the above, there exists a need for water-sealing component assembly which overcomes the above mentioned problems in the prior art. This invention addresses this need in the prior art as well as other needs, which will become apparent to those skilled in the art from this disclosure.

SUMMARY OF THE INVENTION

An object of the present invention is to prevent invasion of water droplets into rotatory-component clearances in a component assembly composed of a relatively rotatable plurality of components, while sustaining rotational efficiency of the rotatory components.

A component assembly in accordance with the first aspect of the invention is a component assembly composed from a relatively rotatable plurality of components and superficially subjected to a water-repellency treatment, the component assembly furnished with: a first component; a second component arranged relatively rotatably leaving a clearance with respect to the first component; and a water-repelling film layer built over at least any one surface of the first component and the second component that forms the clearance.

A water-repellent film layer is built on the surfaces that form the clearance between the rotating first component and second component in this component assembly. Herein, a water-repelling film layer, such as silicone resin or fluorinated resin for example, having water-repellent properties is formed, without a member in addition to the sealing element being installed. Accordingly, invasion of water droplets into the clearance between the first component and the second component is prevented while sustaining rotational efficiency of the first and second components.

A component assembly in accordance with the second aspect of the invention is the component assembly set forth by the first aspect, further including a ground-layer film in between at least either one of the first and second components, and the water-repelling film layer. In this case, the adhesiveness of the water-repelling layer may be improved by for example implementing as a ground-layer film a foundation treatment of various kinds.

A component assembly in accordance with the third aspect of the invention is the component assembly set forth by the first or second aspect, wherein the water-repelling film layer is a thin metallic film impregnated with a fluorinated resin. Water-repelling efficacy may be heightened herein by impregnating for example an electroless nickel-plating layer that is the thin metallic film with a fluorinated resin such as polytetrafluoroethylene (PTFE).

A component assembly in accordance with the fourth aspect of the invention is the component assembly set forth by any of first through third aspects, wherein the water-repelling film layer is formed on at least a one surface among mutually opposing surfaces of the first component and the second component. In this case, invasion of water droplets into the clearance in between the first component and the second component may be prevented by forming the water-repelling film layer on an opposing surface of the first and second components.

A component assembly in accordance with the fifth aspect of the invention is the component assembly set forth by any of first through fourth aspects, wherein the water-repelling film layer is formed on a surface contiguous with at least a one surface among mutually opposing surfaces of the first component and the second component. Water droplets invading the clearance in between the first component and the second component may be prevented in this case by forming the water-repelling film layer for example on the peripheral rim of an opening along which the first and second components are exteriorly exposed.

A component assembly in accordance with the sixth aspect of the invention is the component assembly set forth by any of first through fifth aspects, wherein one of the first component and the second component is a pressing member attached to the outer race of a bearing, and the other of the first component and the second component is a rod member attached to the inner race of the bearing. Water droplets invading the clearance in between a pressing member and a rod member in this case may be prevented by forming the water-repelling film layer on the pressing member and the rod member. Specifically, wherein the bearing is fitted in a fishing reel, the pressing member is for example a retainer that, attached to the front of the rotatory frame of the rotor, presses on the outer race, and the rod member is the spool shaft. Here, a drainage hole for discharging water droplets under centrifugal force during rotation further may be formed in the retainer. The drainage hole does not require being subjected superficially to a water-repellency treatment, or else may be subjected superficially to a hydrophilic treatment having hydrophilic power under centrifugal force.

A component assembly in accordance with the seventh aspect of the invention is the component assembly set forth by any of first through sixth aspects, wherein one of the first component and the second component is a pressing member attached to the outer race of a bearing, and the other of the first component and the second component is a cylindrical member fitted on a rod member attached to the inner race of the bearing. Water droplets invading the clearance in between a pressing member and a cylindrical member in this case may be prevented by forming the water-repelling film layer on the pressing member and the cylindrical member. Specifically, wherein the bearing is fitted in a fishing reel, the pressing member is for example an element that presses on the outer race, the cylindrical member is an element that presses on the inner race, and the rod member is a pinion gear. Here, the water-repelling efficacy may be further improved by forming the contour of the cylindrical member in a shape off which water droplets readily bounce, such as a taper shape, a fin shape, or an involute shape.

A component assembly in accordance with the eighth aspect of the invention is the component assembly set forth by any of first through seventh aspects, wherein one of the first component and the second component is a pressing member attached to the inner race of a bearing, and the other of the first component and the second component is a plate-shaped member attached to the outer race of the bearing. In this case, invasion of water droplets through the clearance in between the pressing member and the plate-shaped member, into the gap at which the inner race and the outer race are apart may be prevented by forming the water-repelling film layer on the pressing member and the plate-shaped member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
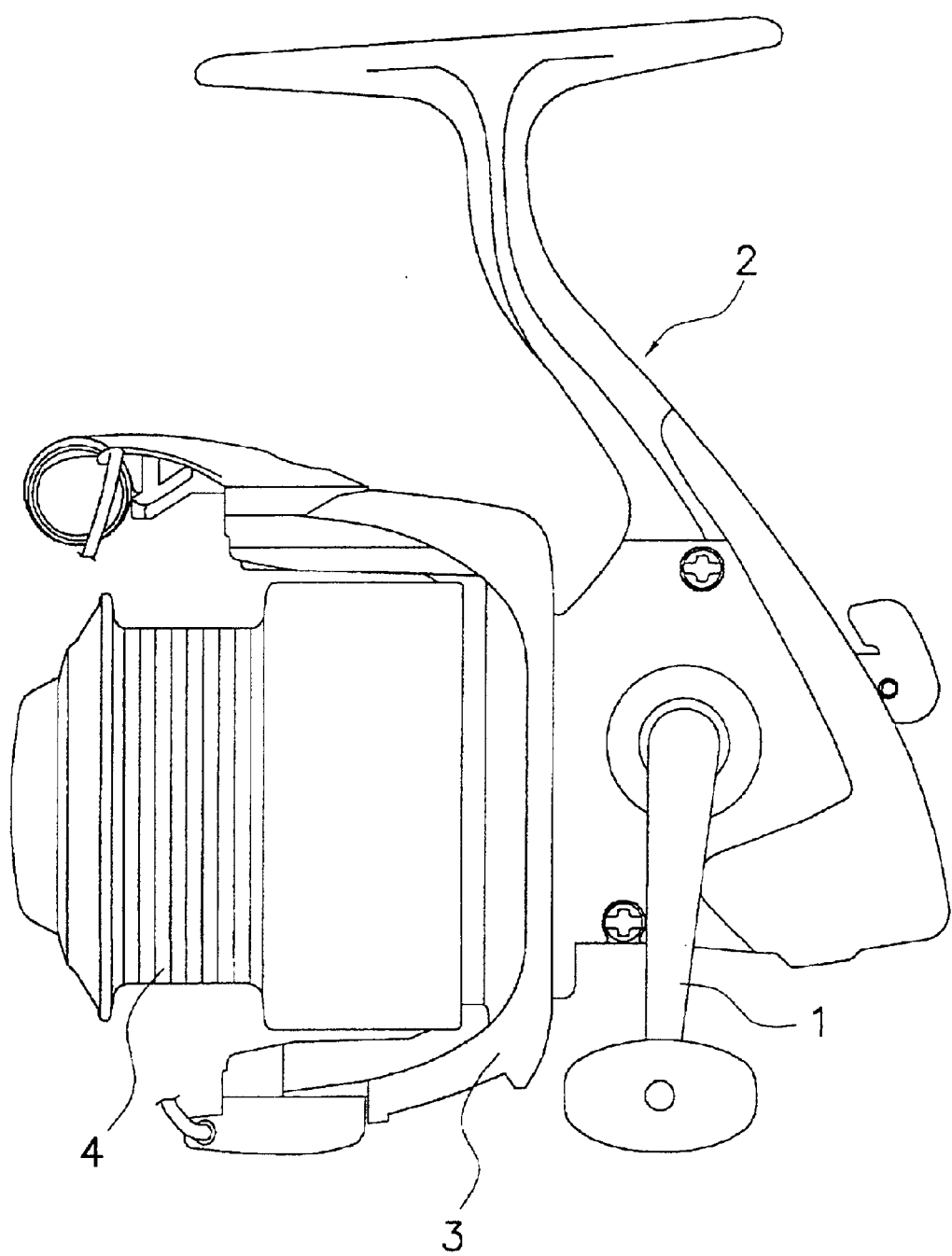
FIG. 1 is a left-side view of a spinning reel in accordance with a first embodiment of the present invention.

A spinning reel in which one embodiment of the present invention is adopted is furnished with, as shown in FIG. 1: a handle 1; a reel unit 2 to which the handle 1 is fitted to be rotatable around a left/right shaft; a rotor 3; and a spool 4. The rotor 3 rotates in cooperation with rotation of the handle 1 to guide fishing line onto the spool 4, and is rotatable around a front-to-rear shaft supported on the front of the reel unit 2. The spool 4 winds fishing line guided by the rotor 3 onto its outer circumferential surface, and is disposed on the front of the rotor 3 movably in the font-rear axial direction.

Figure 2:
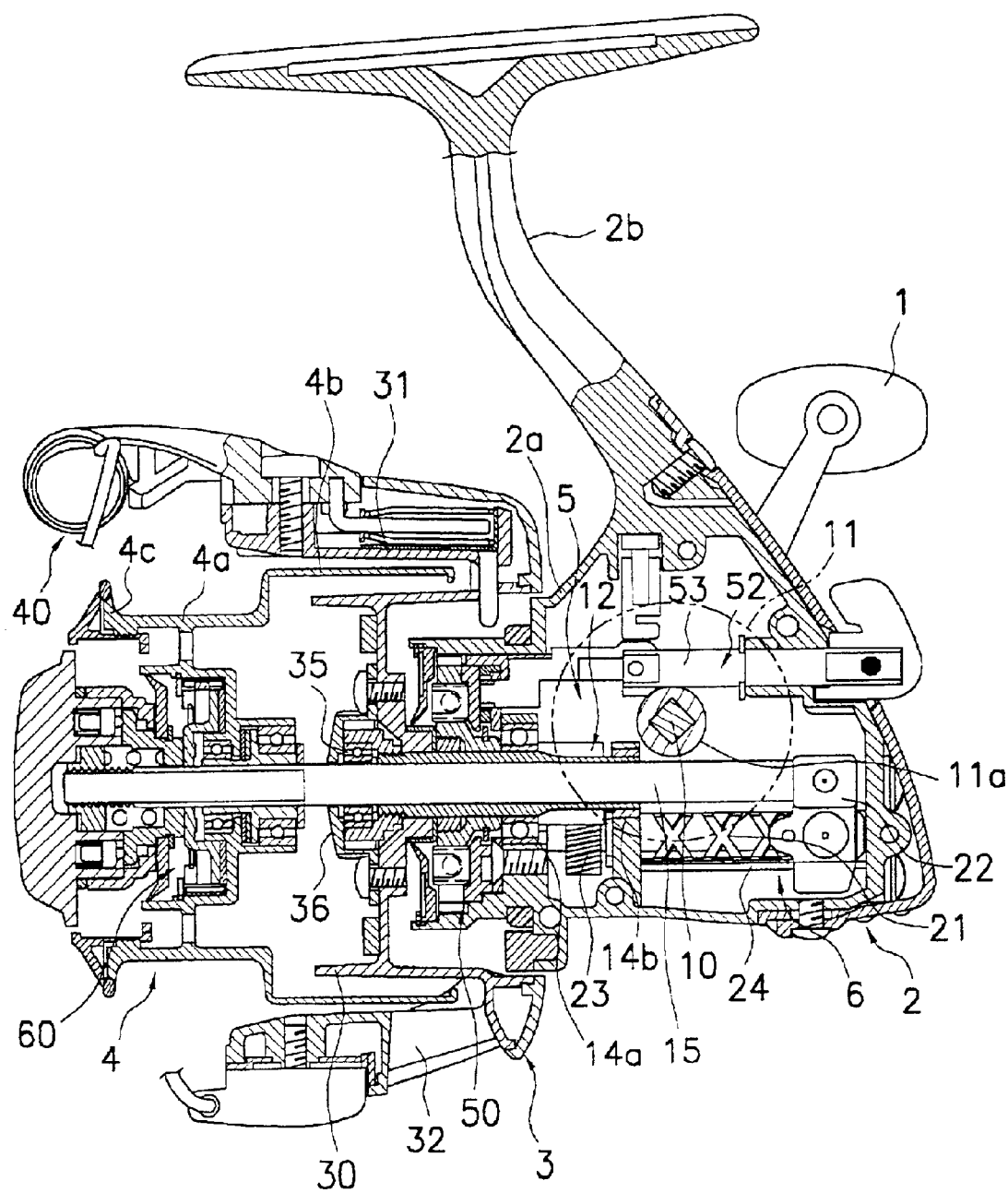
FIG. 2 is a left side, cross-sectional view of the spinning reel.

The reel unit 2, as shown in FIG. 2, includes a reel body 2a composing the chief part of the reel unit 2 and a T-shaped rod-mounting leg 2b extending diagonally up/frontward from and formed integrally with the reel body 2a.

Installed within a mechanism-mounting space provided in the interior of the reel body 2 are, as shown in FIG. 2: a rotor-drive mechanism 5 that rotates the rotor 3 by linkage to rotation of the handle 1; and an oscillating mechanism 6 that pumps the spool 4 back and forth to wind fishing line onto the spool 4 uniformly. A one-way clutch 51 of an anti-reverse mechanism 50 for prohibiting/releasing rotation (reversal) of the rotor 3 in the line reel-out direction is non-rotatably mounted on the front of the reel body 2a.

Figure 3:
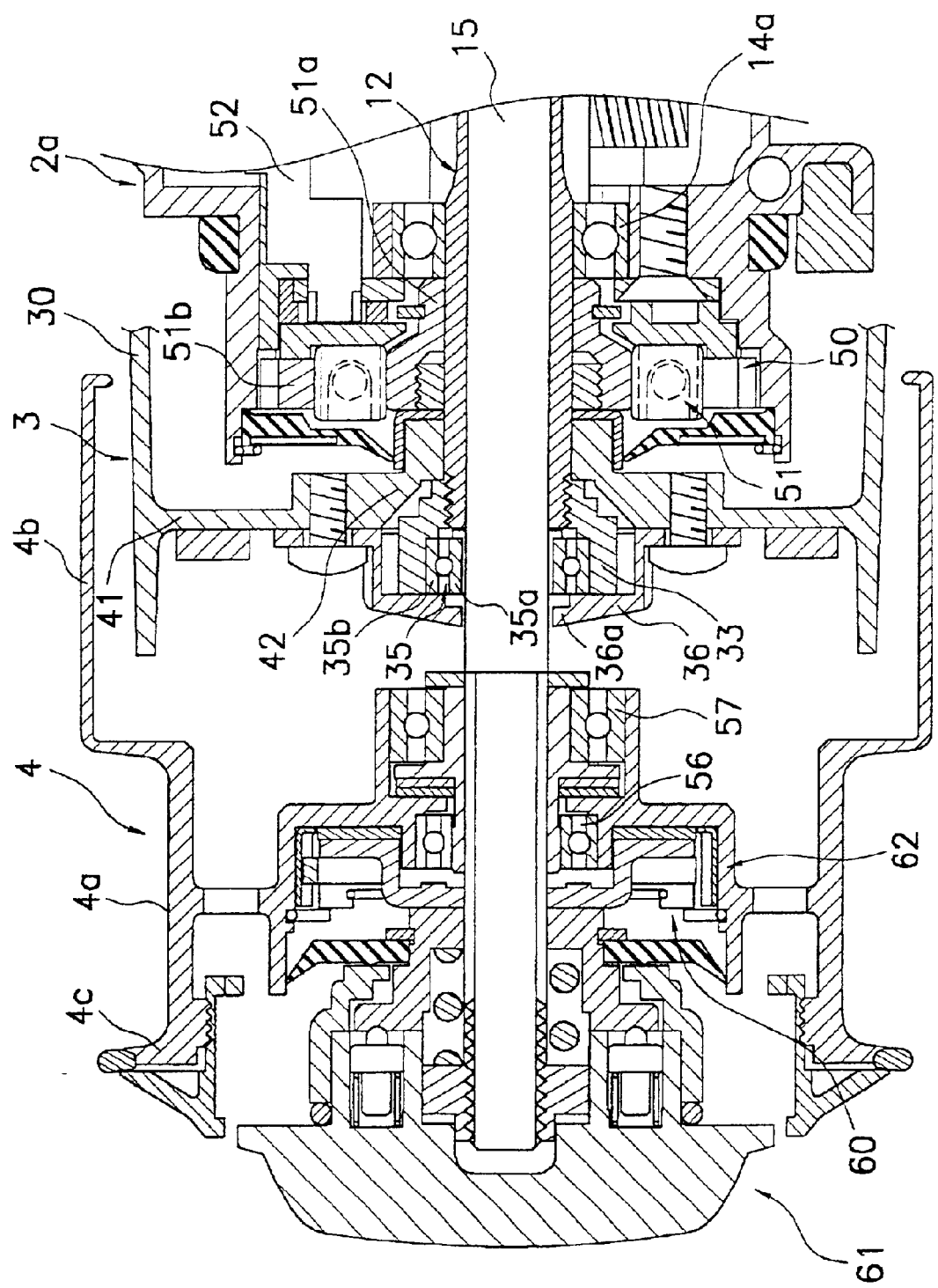
FIG. 3 is an enlarged cross-sectional view of the spool and rotor part.

The rotor 3 includes, as shown in FIGS. 2 and 3: a round cylinder portion 30 fastened to a later-described pinion gear 12; a first rotor arm 31 and a second rotor arm 32 opposing each other and furnished sideways on the round cylinder portion 30; and a bail arm 40 for guiding fishing line onto the spool 4. The round cylinder portion 30 and the first rotor arm 31 and the second rotor arm 32 are made of, e.g., aluminum-alloy, and are formed unitarily.

As shown in FIG. 3, a front wall 41 is formed on the front of the round cylinder portion 30. A rearward-projecting boss 42 is formed in the center portion of the front wall 41. A through-hole into which the pinion gear 12 is non-rotatably interlocked is formed in the center of the boss 42. The pinion gear 12 and a spool shaft 15 pass through the through-hole.

Figure 4:
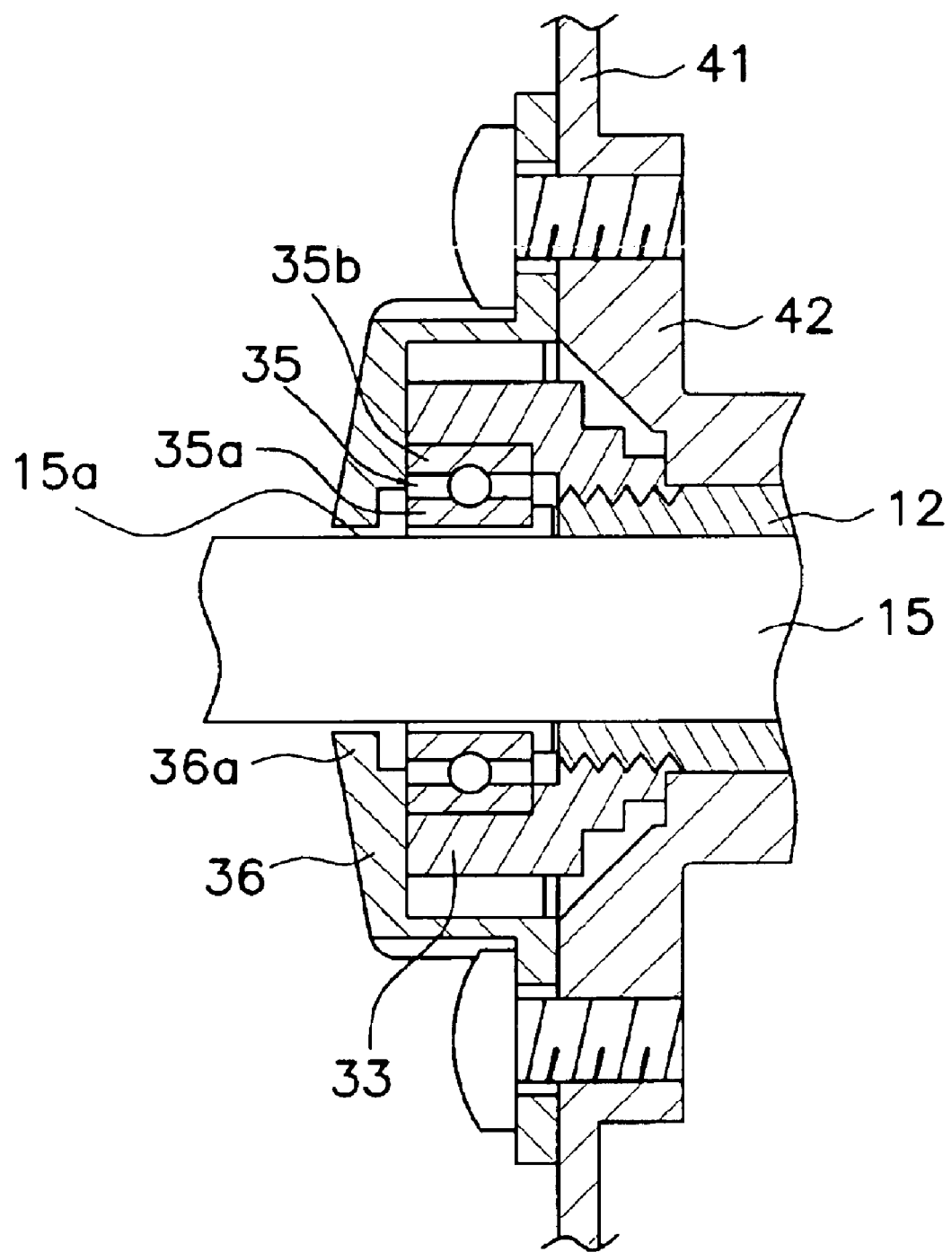
FIG. 4 is an enlarged cross-sectional view of the front part of the rotor.

A nut 33 as shown in FIGS. 3 and 4 screws together with the front portion of the pinion gear 12, and thus the rotor 3 is fastened non-rotatably to the fore end of the pinion gear 12 by the nut 33. A bearing 35 is disposed along the inner periphery of the nut 33. The bearing 35 is furnished to secure a clearance between the spool shaft 15, to which its inner race 35a is attached, and the inner surface of the nut 33, to which the outer race 35b of the bearing 35 is attached. A pressing member 36 (an example of a first component) is mounted on the front faces of the nut 33 and the bearing 35, such that the pressing member 36 abuts on the outer race 35b.

The pressing member 36, as shown enlarged in FIG. 4, is installed so as to be rotatable with respect to the spool shaft 15, which is a rod member. The pressing member 36 is formed in a taper shape that tapers frontward, where its peripheral rim portion is fixed by being screwed fast to the boss 42. A projecting portion 36a, jutting toward the spool shaft 15 and leaving a micro-clearance between the projecting portion 36a and the spool shaft 15 to keep water droplets from invading the interior, is formed in the center portion of the pressing member 36. The pressing member 36 as such is water-repellency treated over all its surfaces, including the face that forms a clearance with an outer peripheral surface 15a (an example of a second component) of the spool shaft 15.

Figure 5:
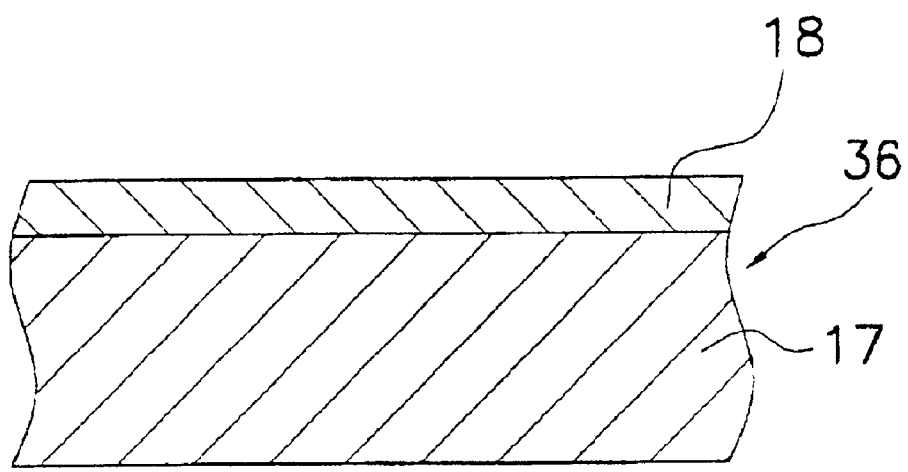
FIG. 5 is a cross-sectional schematic view of the pressing member.

The pressing member 36 includes, as shown in FIG. 5, an aluminum-alloy-fabricated body portion 17, and a water-repelling film layer 18 built on the surface of the body portion 17. The water-repelling film layer 18 is formed by impregnating an electroless nickel-plating layer that is a thin metallic film with a fluorinated resin such as polytetrafluoroethylene (PTFE). With the water-repelling film layer 18 as such, the contact angle of water droplets over the surface of the water-repelling film layer 18 will be e.g., 170 degrees or more, and compared with the 110 degrees that is the contact angle of water droplets in instances treated with a water-repelling agent generally often used, the water-repelling force is extremely heightened.

The spool 4 has, as shown in FIG. 2, a shallow-channel contour, and is disposed between the first rotor arm 31 and the second rotor arm 32 of the rotor 3. The spool 4 is linked to the fore end of the spool shaft 15 via a drag mechanism 60. The spool 4 includes: a bobbin trunk 4a outer-circumferentially onto which fishing line is wound; a skirt 4b that is integrally formed on the rear of the bobbin trunk 4a; and a front flange 4c established on the front end of the bobbin trunk 4a.

The bobbin trunk 4a is, as shown in FIG. 3, roughly a two-tiered round cylindrical member having a boss in the center; and the outer circumferential surface of the cylindrical section on the outer peripheral side consists of a peripheral surface paralleling the spool shaft 15. The bobbin trunk 4a is fitted, as shown in FIG. 3, rotatively to the spool shaft 15 on two bearings 56, 57 fitted into the boss. The skirt 4b, a round cylindrical member having a base, flares diametrically from the rear-end portion of the bobbin trunk 4a, then extends rearward.

As shown in FIG. 2, the rotor drive mechanism 5 includes a face gear 11 into which the handle 1 is non-rotatably fitted, and a pinion gear 12 that meshes with the face gear 11. The face gear 11 is formed unitarily with a face gear spool 11a fitted non-rotatably to a handle shaft 10, and either end of the face gear 11a is rotatively supported via bearings in the reel unit 2.

The pinion gear 12, a cylindrical component, as shown in FIG. 2 is disposed running in the front-to-rear direction, and is fitted rotatively in the reel body 2a. The front portion 12a of the pinion gear 12 passes through the center part of the rotor 3, and in the center part is fastened to the rotor 3 by the nut 33. The pinion gear 12 is rotatively supported at the mid-portion and rear end in the axial direction via respective bearings 14a, 14b in the reel body 2a. The spool shaft 15 passes through the interior of the pinion gear 12. Along with meshing with the face gear 11, the pinion gear 12 also meshes with the oscillating mechanism 6.

The oscillating mechanism 6, as shown in FIGS. 2, has a worm 21 disposed approximately directly beneath and parallel to the spool shaft 15, a slider 22 that moves back and forth along the worm 21, and an intermediate gear 23 fixed to the fore end of the worm 21. The slider 22 is supported so as to be shiftable on two upper/lower guide rods 24 disposed parallel with the worm 21. The hind end of the spool shaft 15 is non-rotatably fixed to the slider 22. The intermediate gear 23 meshes with the pinion gear 12 via a (not illustrated) gear-down train.

The anti-reverse mechanism 50 includes, as shown in FIG. 2, the one-way clutch 51, and a switching mechanism 52 that switches the one-way clutch 51 between an actuated state (reverse-prohibited state) and a non-actuated state (reverse-permitted state).

As shown in FIG. 3, the inner race 51a of the one-way clutch 51—a roller-type one-way clutch whose inner race is free-rotating—is fitted non-rotatably to the pinion gear 12, and the outer race 51b is fitted non-rotatably into the cylindrical section of the reel-body 2a front.

The switching mechanism 52 includes, as shown in FIG. 2, a stopper shaft 53 that has an operating knob on the end in the rear of the reel body 2a. The stopper shaft 53 is mounted on the reel body 2a to be pivotable in between a non-operational posture and an operational posture. The other end of the stopper shaft 53 is engaged with the one-way clutch 51, wherein the configuration is such that the pivoting of the stopper shaft 53 switches the one-way clutch 51 between the non-operational posture and the operational posture.

The drag mechanism 60, mounted, as shown in FIGS. 2 and 3, between the spool 4 and the spool shaft 15, is a device for applying drag force to the spool 4. The drag mechanism 60 has, as shown in FIG. 3: a knob unit 61 for adjusting the drag force by hand; and a friction unit 62 made up of a plurality of disks that are pressed toward the spool 4 by means of the knob unit 61.

Next, handling and operation of the spinning reel will be explained.

With this spinning reel, when the line is to be reeled out during casting or the like, the bail arm 40 is flipped over into its line-releasing posture. Consequently, the fishing line is reeled out successively from the leading-edge side of the spool 4 by the terminal tackle under its own weight.

During line retrieval, the bail arm 40 is returned into its line-retrieving posture. This automatically takes place by the functioning of a not-illustrated bail-flipping mechanism while the handle 1 is rotated in the line-retrieving direction.

The handle 1 torque is transmitted to the pinion gear 12 via the face gear shaft 11a and the face gear 11. The torque transmitted to the pinion gear 12 is transmitted from its front portion 12a to the rotor 3, and meanwhile is transmitted via the gear-down train to the oscillating mechanism 6 by the intermediate gear 23 that meshes with the pinion gear 12. Consequently, along with the rotor 3 rotating in the line-retrieving direction, the spool 4 pumps back and forth.

In a spinning reel as such, since the water-repelling film layer 18 is built on the surfaces of the pressing member 36, water droplets are prevented form invading in between the pressing member 36 and the spool shaft 15 that rotates relative thereto, while rotational efficiency of the pressing member 36, i.e., the rotor 3 is sustained.

Other Embodiments (a) In the foregoing, a front-drag model spinning reel was illustrated as an example, but the present invention is not thereby limited, and may be applied in rear-drag model spinning reels and in spinning reels not having a drag. Likewise, the present invention may be applied in everything that is configured by a plurality of relatively rotatable components, such as fishing reels apart from spinning reels, e.g., dual-bearing reels and cantilevered-bearing reels, and in bicycles.

(b) All surfaces of the pressing member 36 in the foregoing embodiment example are subjected to a water-repellency treatment; but the water-repellency treatment may be carried out instead only on the surfaces of the pressing member 36 on its front, and on its inner periphery where it opposes the spool shaft 15.

Figure 6:
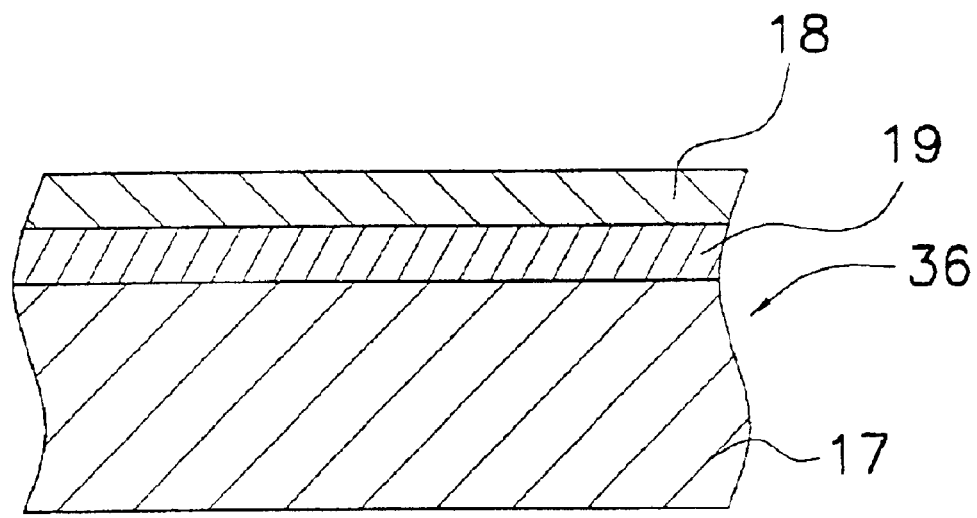
FIG. 6 is a cross-sectional schematic view of the pressing member corresponding to FIG. 5, in accordance with another embodiment.

(c) In the foregoing embodiment, the water-repelling film layer 18 is built on the surface of the body portion 17. But as shown in FIG. 6, a ground-layer film 19 may be formed in between the body portion 17 and the water-repelling film layer 18. Likewise, in the foregoing embodiment, the water-repelling film layer 18 is formed by impregnating an electroless nickel-plating layer with PTFE. But the present invention is not thereby limited; the water-repelling film layer 18 may be formed by impregnating with a silicone resin or fluorinated resin having water-repelling properties.

Figure 7:
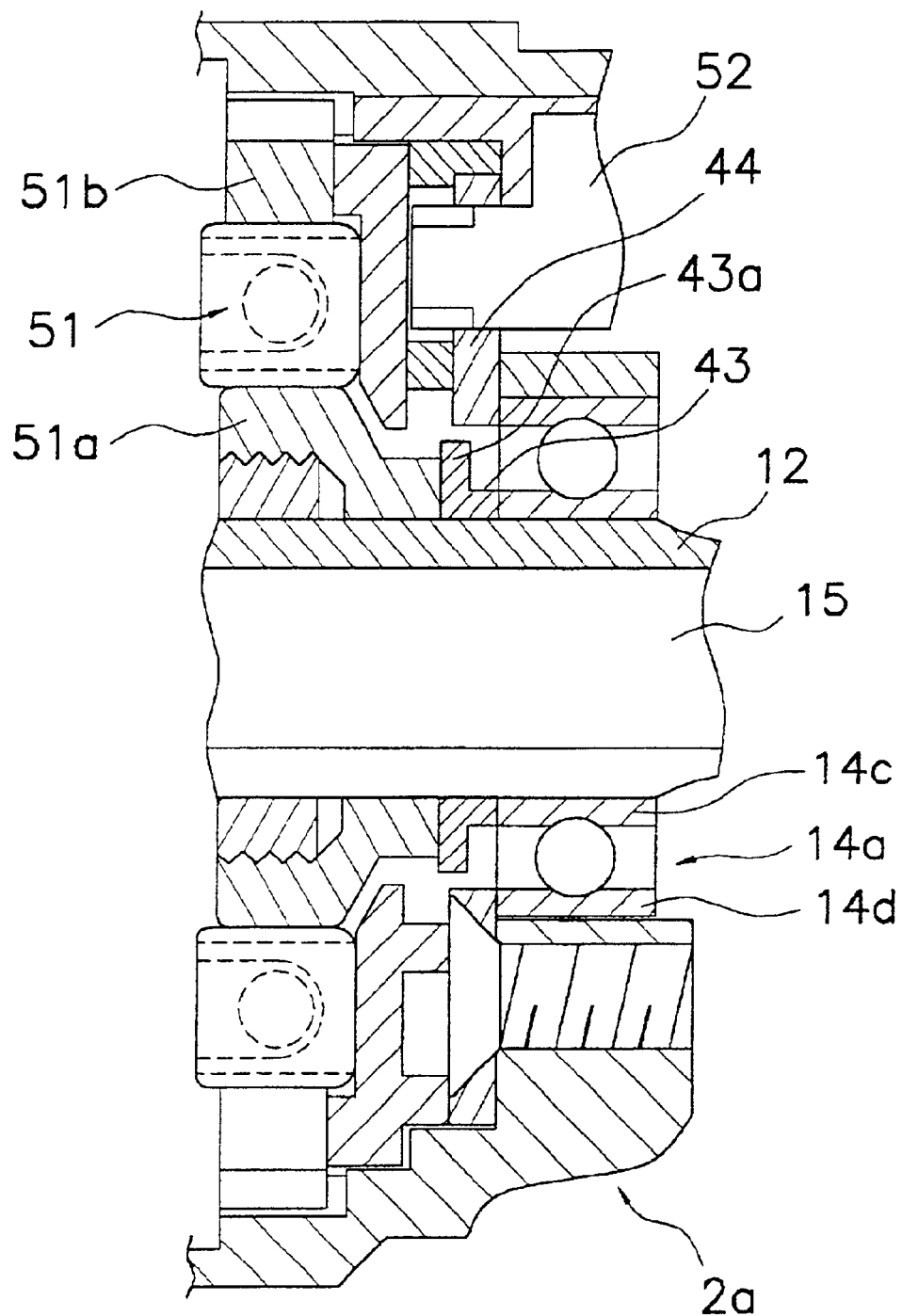
FIG. 7 is an enlarged cross-sectional view of the environs of a cylindrical member in accordance with the another embodiment.

(d) As indicated in FIG. 7, a cylindrical member 43 (the first component in this embodiment), all surfaces of which are water-repellency treated may be interposed in between the one-way clutch 51 inner race 51a and the bearing 14a, about the outer periphery of the pinion gear 12. In addition, a pressing member 44, all surfaces of which are water-repellency treated, may be fitted in between the reel body 2a and the bearing 14a. The cylindrical member 43 is mounted such that it abuts on the front of the inner race 14c of the bearing 14a. The pressing member 44 is screwed fast into abutment on the front of the outer race 14d of the bearing 14a. Herein, water droplets are blocked from invading into the bearing 14a interior through the clearance in between the cylindrical member 43 and the pressing member 44.

Figure 8:
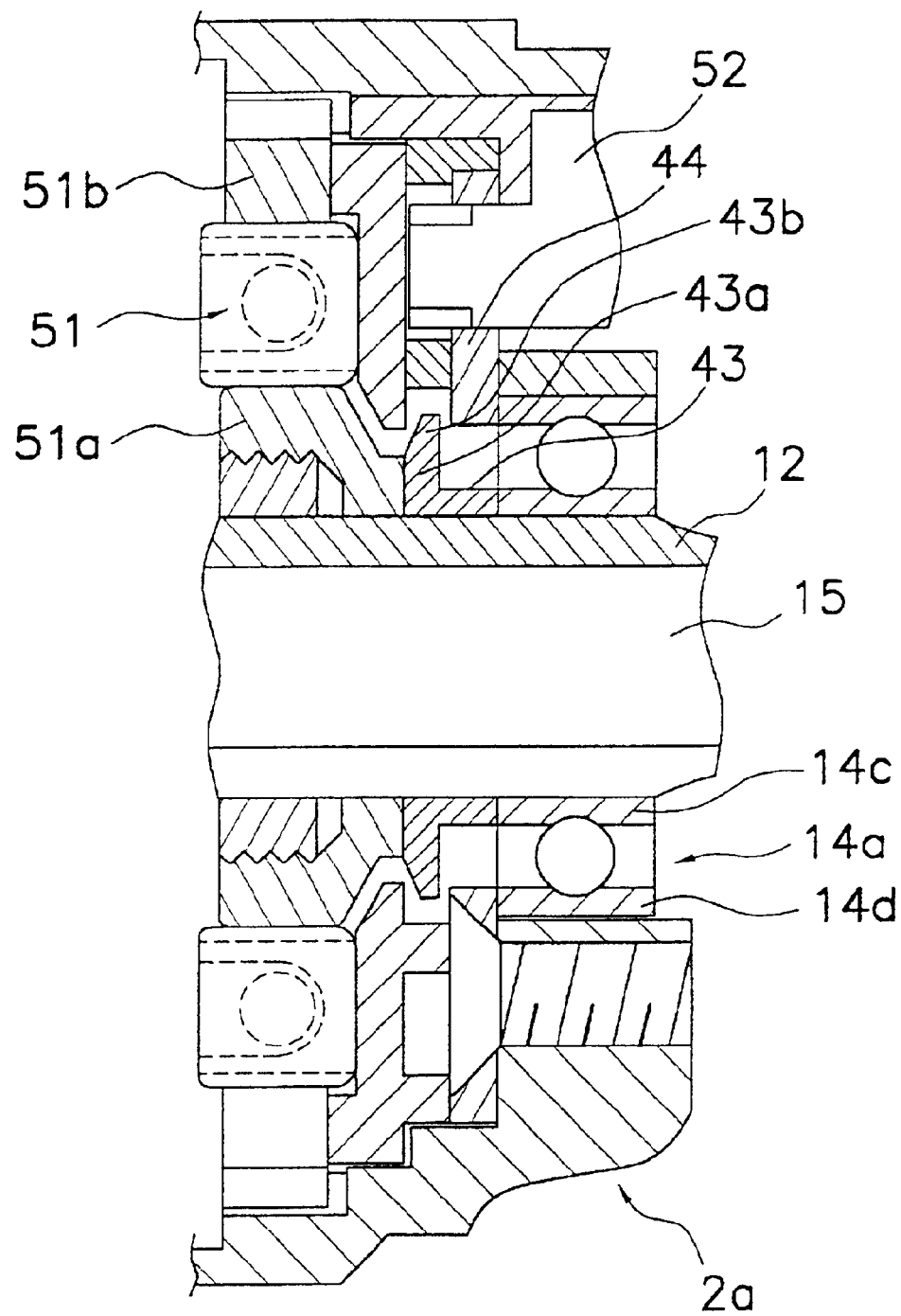
FIG. 8 is an enlarged cross-sectional view of the environs of a cylindrical member corresponding to FIG. 7, in accordance with still another embodiment.
Figure 9:
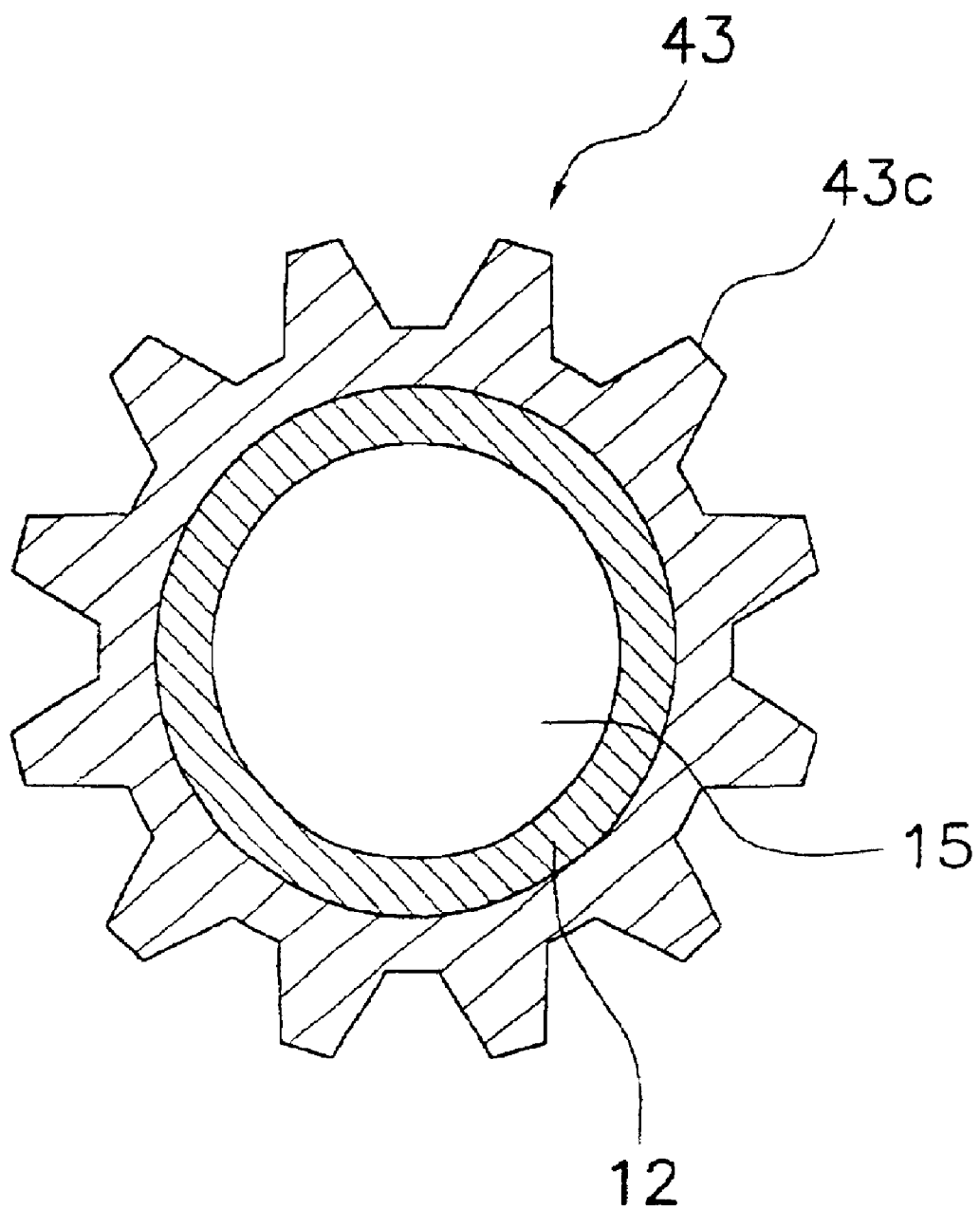
FIG. 9 is a cross-sectional view in the axial direction of aforesaid cylindrical member, in accordance with still another embodiment.

A projecting portion 43a is formed projecting outward on the front of the cylindrical member 43 (the first component in this embodiment). The projecting portion 43a, as shown in FIG. 8, further may be furnished with a lip portion 43b that tapers out such that the radius of the lip portion 43b decreases in a frontward direction. In addition, as shown in FIG. 9, the outer contour of the cylindrical member 43 may be formed in an involute shape, to establish a plurality of the projecting portions 43c. In any case, water droplets will more readily be driven off during rotation of the cylindrical member 43.

Figure 10:
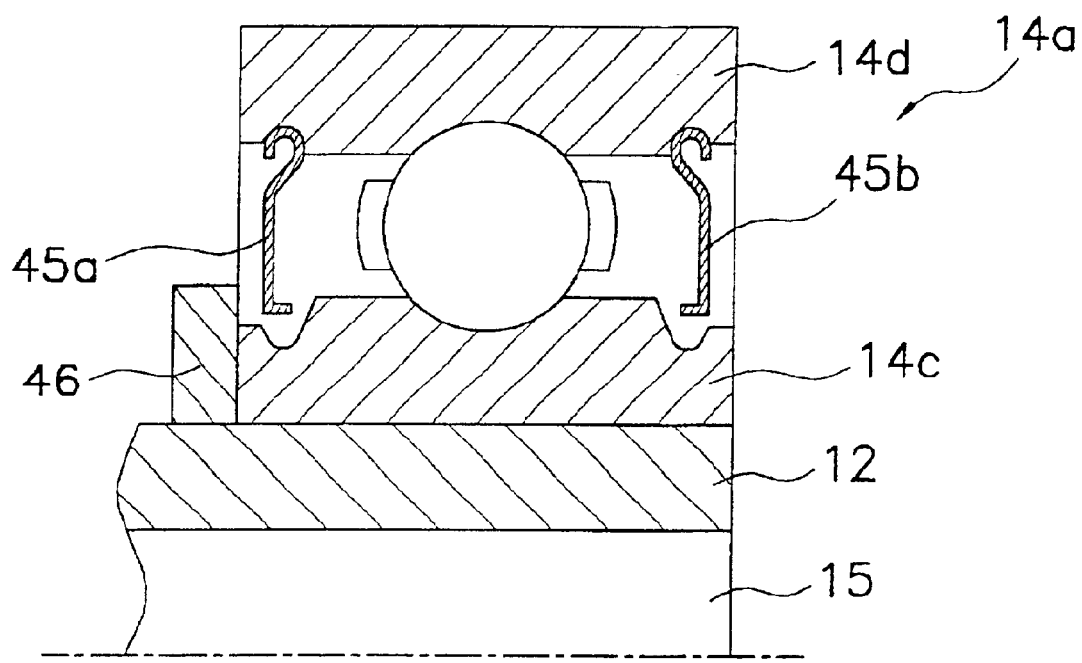
FIG. 10 is an enlarged sectional view of the environs of a bearing, in accordance with still another embodiment.

(e) As shown in FIG. 10, the present invention may further include: a plurality of plate-shaped members 45a, 45b fitted in the outer race 14d of the bearing 14a, and all surfaces of which are water-repellency treated; and a pressing member 46 mounted on the front of the inner race 14c of the bearing 14a and all surfaces of which are water-repellency treated. In this case, water droplets are prevented from invading into the bearing 14a interior. Here, the present invention may be such that invasion of water droplets between the plate-shaped members 45a, 45b and the inner race 14c is prevented by furnishing only the water-repellency-treated plate-shaped members 45a, 45b, without providing the pressing member 46 (the first component in this embodiment) as shown in FIG. 10.

Effects of Invention

In a component assembly having relatively rotatable first and second components, according to the present invention, since a water-repelling film layer is provided on the surfaces that form the clearance between the first component and second component, it is possible to prevent invasion of water droplets into the clearance between the relatively rotatable components, while sustaining the rotational efficiency of the rotatory components.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Published Japanese Patent Application No. 2001-063349. The entire disclosure of Published Japanese Patent Application No. 2001-063349 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A water-sealing component assembly, comprising:
    a first component that is rotatable around a rotational axis;
    a second component arranged adjacent said first component such that a micro clearance is defined between clearance-defining surfaces of said first and second components, said first component being rotatable relative to said second component via a bearing that has an inner race and an outer race and is disposed adjoining at least one of said first and second components in a direction of the rotational axis, said micro clearance being smaller than a gap between said inner and outer races of said bearing;
    sealing means for preventing water from invading the gap between said inner and outer races of said bearing solely by water repellency of a water-repelling film layer provided on at least said clearance-defining surface of said first component, said sealing means having said micro clearance and said water-repelling film layer.

2. The water-sealing component assembly set forth in claim 1, further comprising
a ground-layer film provided in between said water-repelling film and said clearance-defining surface of one of said first and second components on which said water-repelling film layer is provided.

3. The water-sealing component assembly set forth in claim 1, wherein
said water-repelling film layer is a thin metallic film impregnated with a fluorinated resin.

4. The water-sealing component assembly set forth in claim 1, wherein
said clearance-defining surface on which said water-repelling film layer is formed is on at least one of mutually opposing surfaces of said first and second components.

5. The water-sealing component assembly set forth in claim 1, wherein
said clearance-defining surface on which said water-repelling film layer is formed is on a surface that is contiguous with at least one of mutually opposing surfaces of said first and second components.

6. The water-sealing component assembly set forth in claim 1, wherein
said first component has a pressing member that is adjoiningly attached to said outer race of said bearing, and
said second component has a rod member that is attached to said inner race of said bearing.

7. The water-sealing component assembly set forth in claim 1, wherein:
a rod member is attached to said inner race of said hearing,
said first component has a pressing member that is adjoiningly attached to said outer race of said bearing, and
said second component has a cylindrical member that is fitted to said rod member.

8. The water-sealing component assembly set forth in claim 1, wherein
said first component has a plate-shaped member that is attached to said outer race of said bearing, and
said second component has a pressing member that is adjoiningly attached to said inner race of said bearing.

9. The water-sealing component assembly set forth in claim 1, wherein
said water-repelling film layer is provided on both of said clearance-defining surfaces of said first and said second components.

10. The water-sealing component assembly set forth in claim 7, wherein
said cylindrical member has a projecting portion, which has a lip portion that tapers out.

11. The water-sealing component assembly, comprising:
a first component;
a second component arranged adjacent said first component such that a clearance is defined between clearance-defining surfaces of said first and second components, said first component being rotatable relative to said second component;
a water-repelling film layer provided on at least one of said clearance-defining surfaces of said first and said second components that define said clearance;
a bearing having an inner race and an outer race; and
a rod member attached to said inner race of said bearing,
said first component having a pressing member that is attached to said outer race of said bearing,
said second component having a cylindrical member that is fitted to said rod member,
said cylindrical member having a plurality of projecting portions.

12. A fishing reel attachable to a fishing rod, said fishing reel comprising:
a reel body to be attached to the fishing rod;
a first component that is rotatable around a rotational axis;
a second component unrotatable relative to said reel body, said second component being arranged adjacent said first component such that a micro clearance is defined clearance-defining surfaces of said first and second components, said first component being rotatable relative to said second component via a bearing that has an inner race and an outer race and is disposed adjoining at least one of said first and second components in a direction of the rotational axis, said micro clearance being smaller than a gap between said inner and outer races of said bearing; and
sealing means for preventing water from invading the gap between said inner and outer races of said bearing solely by water repellency of a water-repelling film layer provided on at least said clearance-defining surface of said first component, said sealing means having said micro clearance and said water-repelling film layer.

13. The fishing reel set forth in claim 12, further comprising
a ground-layer film provided in between said water-repelling film and said clearance-defining surface of one of said first and second components on which said water-repelling film layer is provided.

14. The fishing reel set forth in claim 12, wherein
said water-repelling film layer is a thin metallic film impregnated with a fluorinated resin.

15. A spinning reel comprising:
a handle;
a reel unit to which said handle is rotatably fitted, said reel unit having a spool shaft;
a rotor rotatable about said spool shaft in cooperation with rotation of said handle;
a spool disposed adjacent said rotor to wind fish line guided by said rotor, said spool being axially movable along said spool shaft; and
a water-sealing structure defined between said rotor and said spool shaft, including
a first component attached to said rotor,
a second component attached to said spool shaft and arranged adjacent to said first component such that a micro clearance is defined between opposing surfaces of said first and second components, said first component being rotatable relative to said second component via a bearing that has an inner race and an outer race and is disposed adjoining at least one of said first and second components in a direction of said spool shaft, said micro clearance being smaller than a gap between said inner and outer races of said bearing; and sealing means for preventing water from invading the gap between said inner and outer races of said bearing solely by water repellency of a water-repelling film layer provided on at least said opposing surface of said first component, said sealing means having said micro clearance and said water-repelling film layer.

16. The spinning reel set forth in claim 15, wherein said bearing has an inner race and an outer race, said outer race being attached to said rotor, said inner race being attached to said spool shaft, said first component has a pressing member that is adjoiningly attached to said outer race of said bearing, and said second component is an outer peripheral surface of said spool shaft.

17. The spinning reel set forth in claim 15, wherein:

said first component has a pressing member that is adjoiningly attached to said outer race of said bearing, and said second component has a cylindrical member that is fitted to said spool shaft.

18. The spinning reel set forth in claim 15, wherein said first component has a plate-shaped member that is attached to said outer race of said bearing, and said second component has a pressing member that is adjoiningly attached to said inner race of said bearing.

19. The spinning reel set forth in claim 15, wherein said water-repelling film layer is provided on both of said opposing surfaces of said first and said second components.

20. The spinning reel set forth in claim 17, wherein said cylindrical member has a projecting portion, which has a lip portion that tapers out.

21. The spinning reel comprising:

a handle;

a reel unit to which said handle is rotatably fitted, said reel unit having a spool shaft;

a rotor rotatable about said spool shall in cooperation with rotation of said handle;

a spool disposed adjacent said rotor to wind fish line guided by said rotor, said spool being axially movable along said spool shaft; and a water-sealing structure defined between said rotor and said spool shaft, including a first component attached to said rotor, a second component attached to said spool shaft and arranged adjacent to said first component such that a clearance is defined between opposing surfaces of said first and second components, said first component being rotatable relative to said second component, a water-repelling film layer provided on at least one of said opposing surfaces of said first and said second components, and a bearing having an inner race and an outer race, said outer race being attached to said rotor, said inner race being attached to said spool shaft, said first component having a pressing member that is attached to said outer race of said bearing, and said second component having a cylindrical member that is fitted to said spool shaft, said cylindrical member having a plurality of projecting portions.

* * * * *